United States Patent
Morici et al.

(10) Patent No.: US 6,400,313 B1
(45) Date of Patent: Jun. 4, 2002

(54) PROJECTION OF MULTI-SENSOR RAY BASED DATA HISTORIES ONTO PLANAR GRIDS

(75) Inventors: Martin M. Morici, Timonium; James R. Brinsley, Severna Park, both of MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/677,154

(22) Filed: Oct. 2, 2000

Related U.S. Application Data

(60) Provisional application No. 60/175,776, filed on Jan. 12, 2000.

(51) Int. Cl.[7] .................................................. G01S 7/10
(52) U.S. Cl. ........................ 342/176; 342/179; 342/185; 342/197; 345/958
(58) Field of Search ................................. 342/176, 179, 342/180, 185, 195, 197; 345/419, 420, 421, 427, 438, 473, 474, 581, 630, 953, 958

(56) References Cited

U.S. PATENT DOCUMENTS

| | | | | |
|---|---|---|---|---|
| 4,965,753 A | * | 10/1990 | Kraemer | 345/421 |
| 5,198,819 A | | 3/1993 | Susnjara | 342/26 |
| 5,398,033 A | | 3/1995 | Michie | 342/26 |
| 5,490,239 A | * | 2/1996 | Myers | 345/581 |
| 5,583,972 A | | 12/1996 | Miller | 395/119 |
| 5,644,386 A | * | 7/1997 | Jenkins et al. | 356/4.01 |
| 5,742,297 A | | 4/1998 | Logan | 345/438 |
| 5,745,126 A | * | 4/1998 | Jain et al. | 382/154 |
| 5,751,289 A | * | 5/1998 | Myers | 345/419 |
| 5,781,146 A | | 7/1998 | Frederick | 342/26 |
| 5,838,262 A | * | 11/1998 | Kershner et al. | 340/945 |
| 5,839,089 A | | 11/1998 | Yasuda et al. | 702/3 |
| 5,872,571 A | | 2/1999 | Arling | 345/427 |
| 5,920,276 A | | 7/1999 | Frederick | 342/26 |
| 5,940,776 A | | 8/1999 | Baron et al. | 702/4 |
| 5,983,251 A | * | 11/1999 | Martens et al. | 708/203 |
| 6,124,864 A | * | 9/2000 | Madden et al. | 345/473 |

FOREIGN PATENT DOCUMENTS

WO       200155742 A   *  8/2001

OTHER PUBLICATIONS

Computational Geometry for Design and Manufacture, 1979, I.D. Faux and M. J. Pratt, Chapter 3, pp. 69–83.

* cited by examiner

Primary Examiner—John B. Sotomayor
(74) Attorney, Agent, or Firm—Loria B. Yeadon

(57) ABSTRACT

A method and apparatus which perform efficient projection of 4-dimensional data (3 spatial and 1 time dimension) onto planar grids are described. Multiple frames of data are drawn from a limited time history data buffer and projected onto a planar grid, which need not be flat, defined in its own coordinate system. Higher dimensional data structures can also be formed from multiple projection grids. Measurement data from multiple data frames is projected into the planar grid such that distance out of plane is the z-dimension. Computational efficiency is achieved by processing only those data samples that are relevant to the planar grid. To be considered relevant, the impulse response of the sensor's measurement rays must cross the planar grid. Samples of relevant rays must also map onto the planar grid's coordinate mesh to be relevant. Multiple data measurements may determine the planar grid's final amplitude result. Amplitudes at the planar grid coordinates are determined by the most relevant measurement(s) of those within the extent of the measurement system's impulse response.

10 Claims, 14 Drawing Sheets

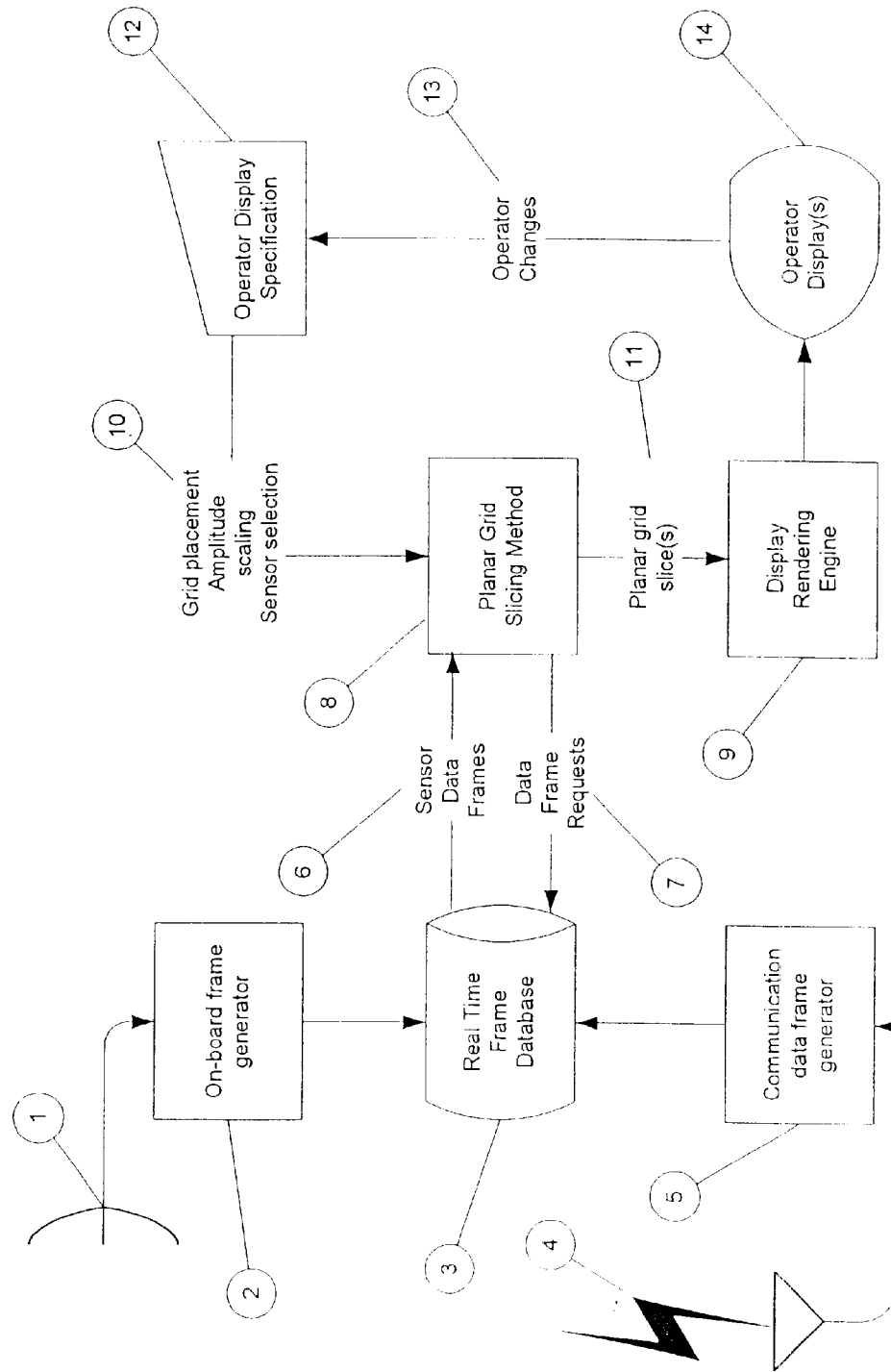
Figure 1: Projection Method Context

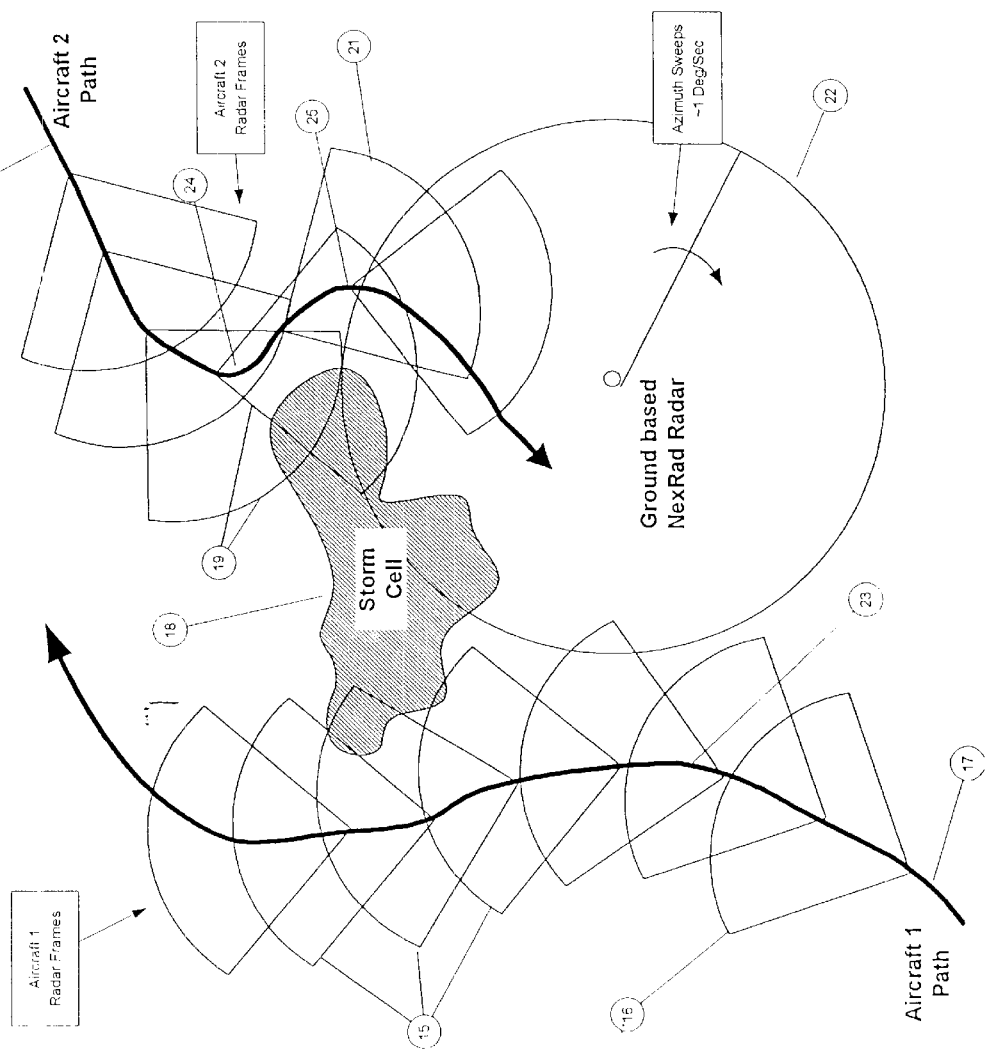
Figure 2: Representative Application

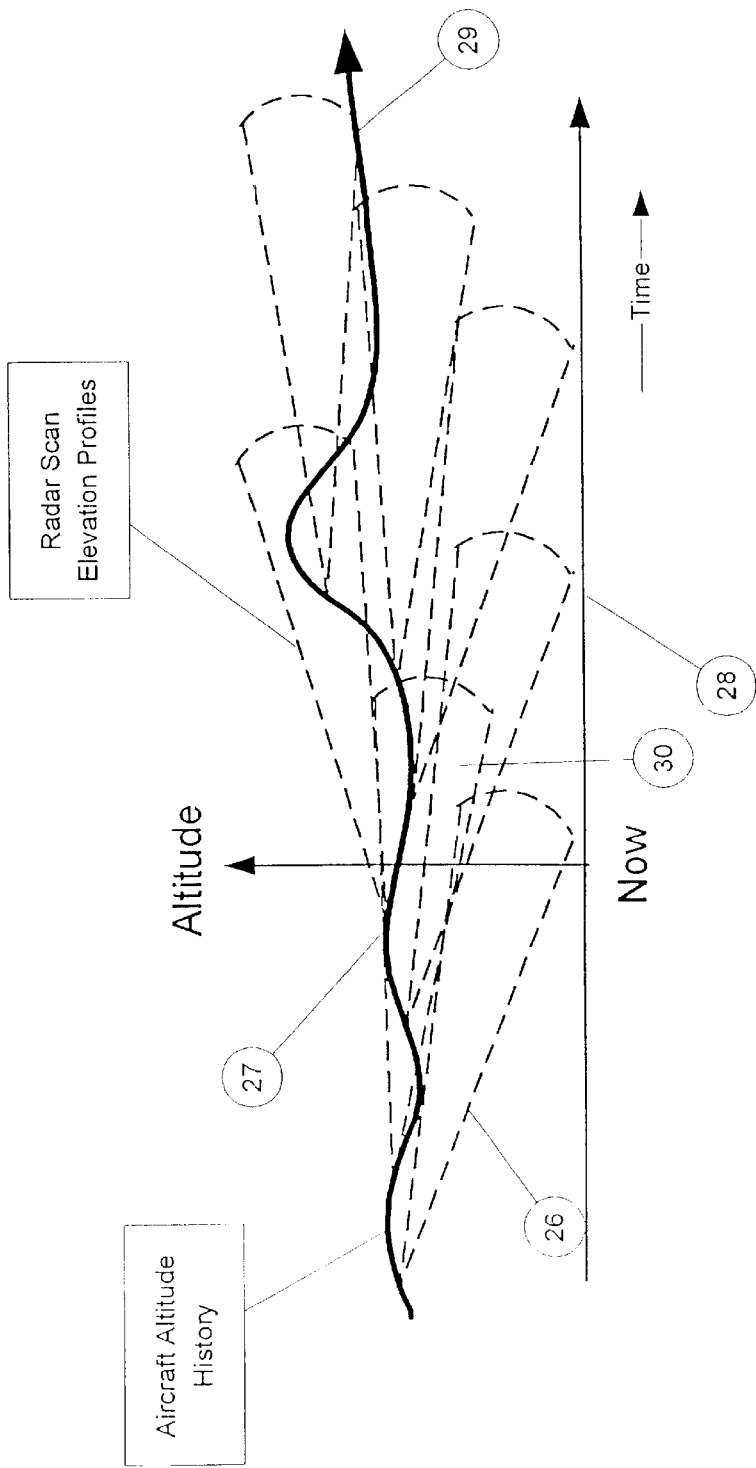
Figure 3: Vertical Scan History

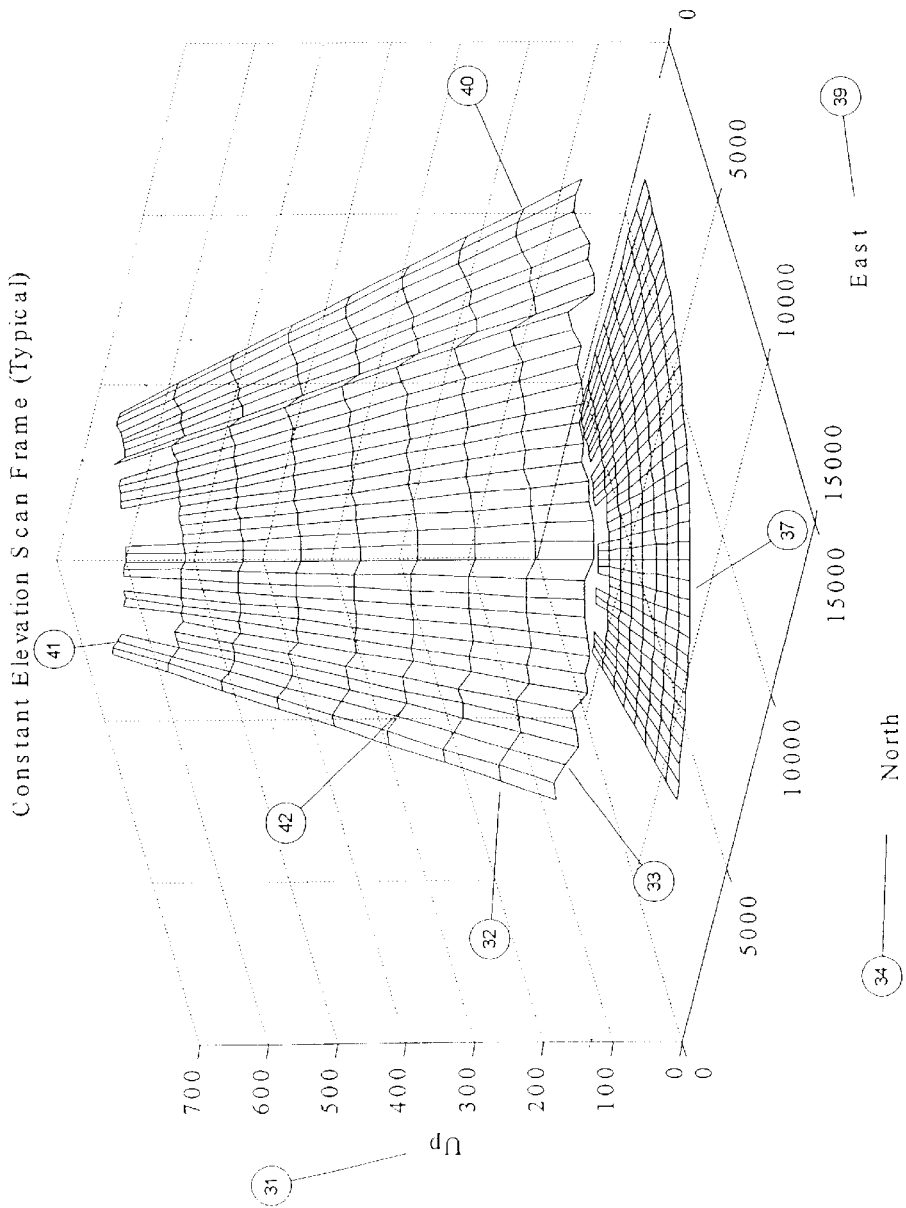
Figure 4: Constant Elevation Frame (Typical)

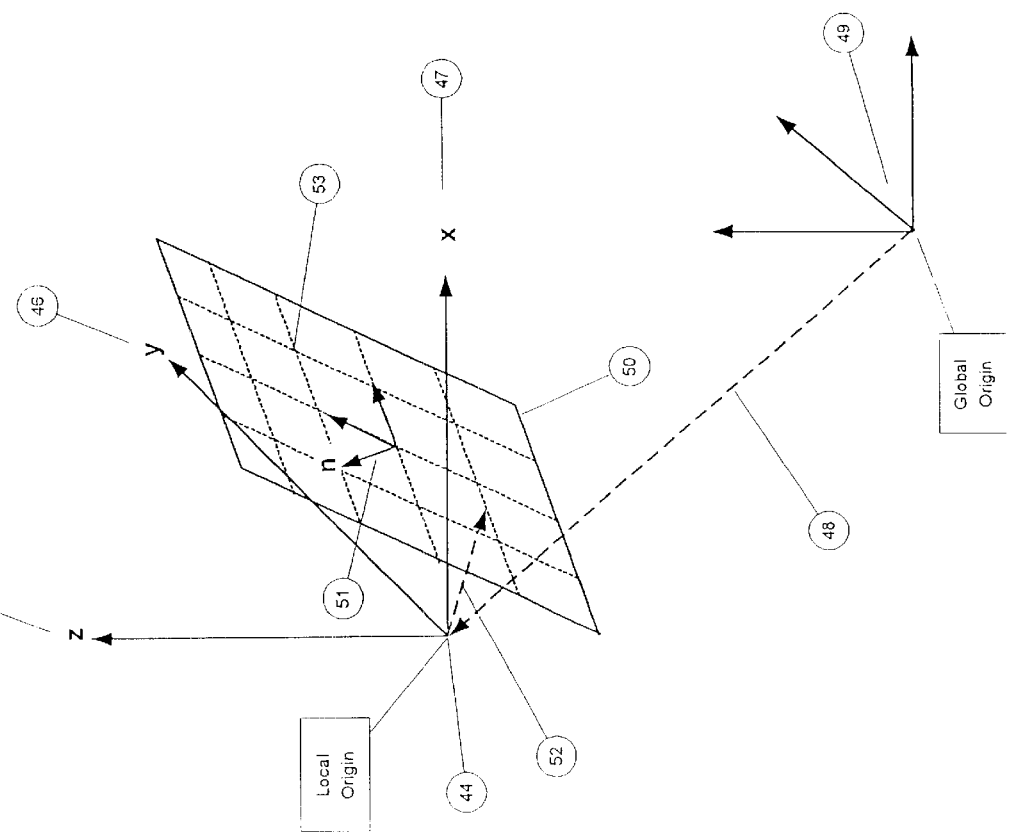
Figure 5: Planar Image Grid Definition

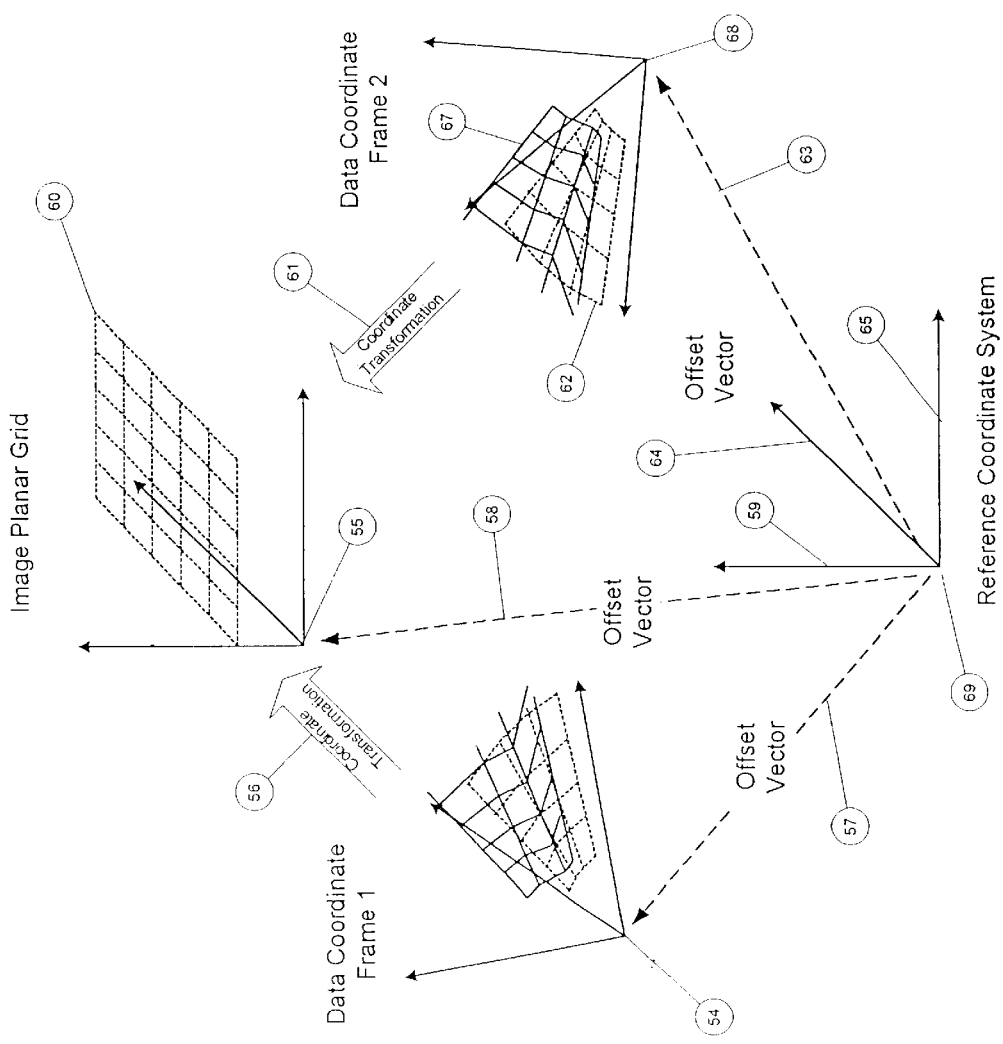
Figure 6: Data Frame Transformation

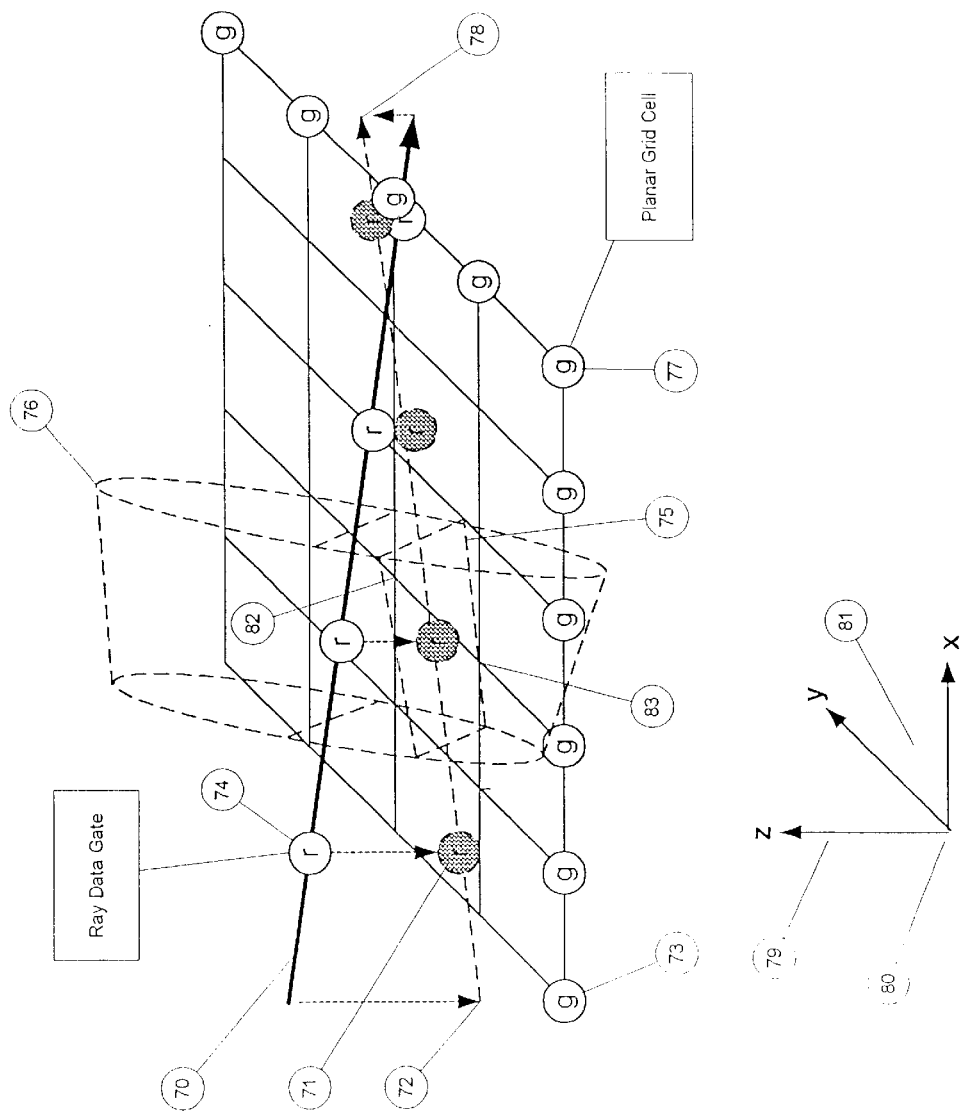
Figure 7: Map Ray Data Gates onto Grid Cells

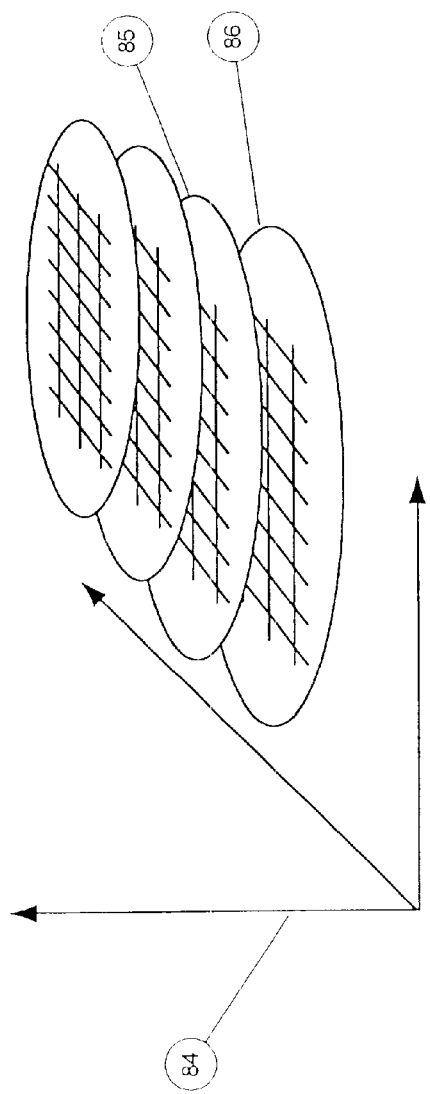
Figure 8a: Multiple Horizontal Slices

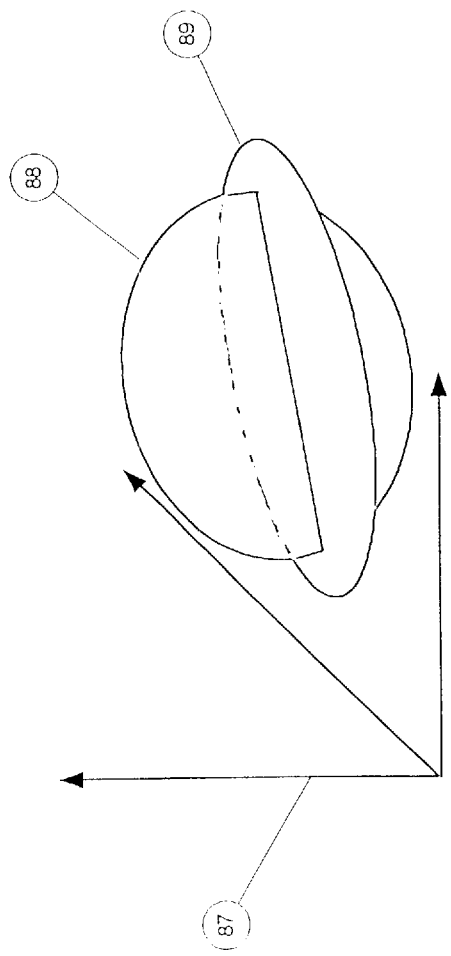
Figure 8b: Horizontal and Vertical Slice

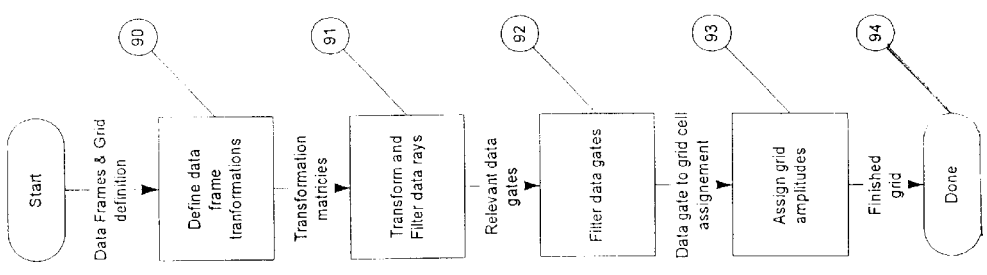
Figure 9: Process architecture

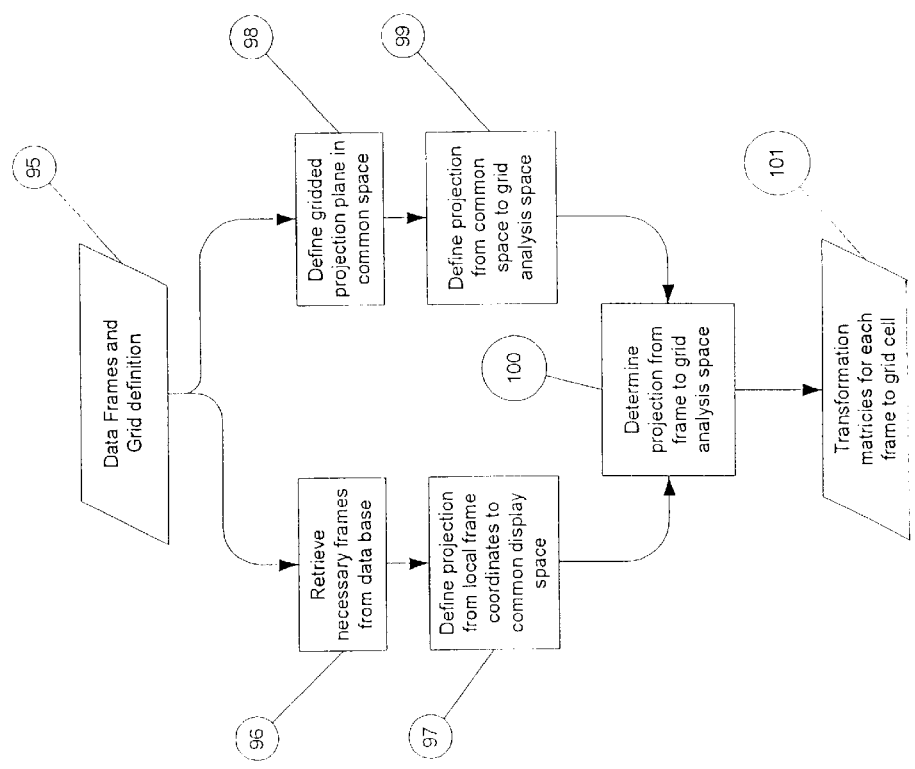
Figure 10: Define Projection Transformations

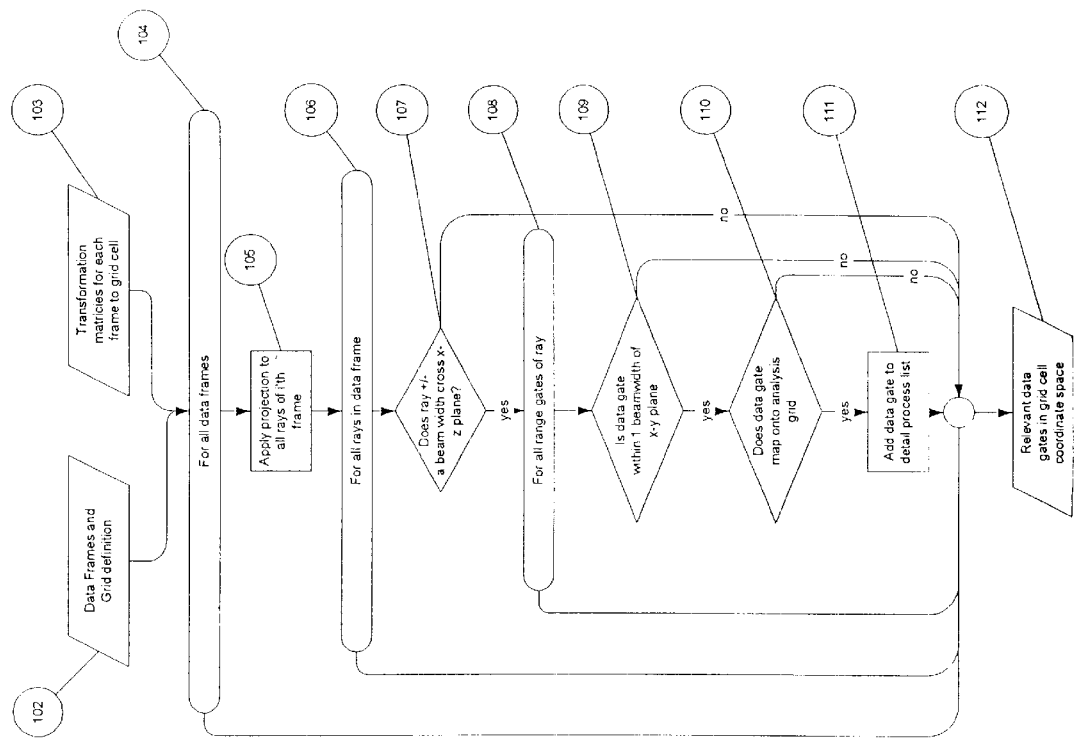
Figure 11: Filter data rays

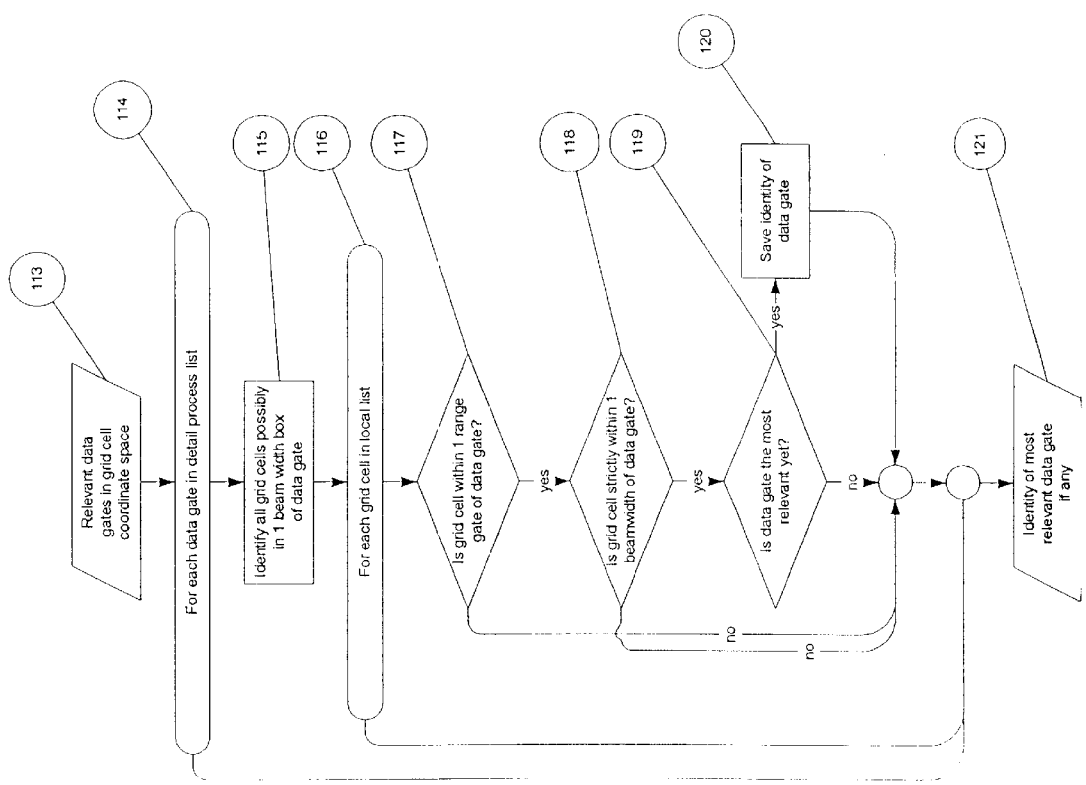
Figure 12: Filter Data Gates

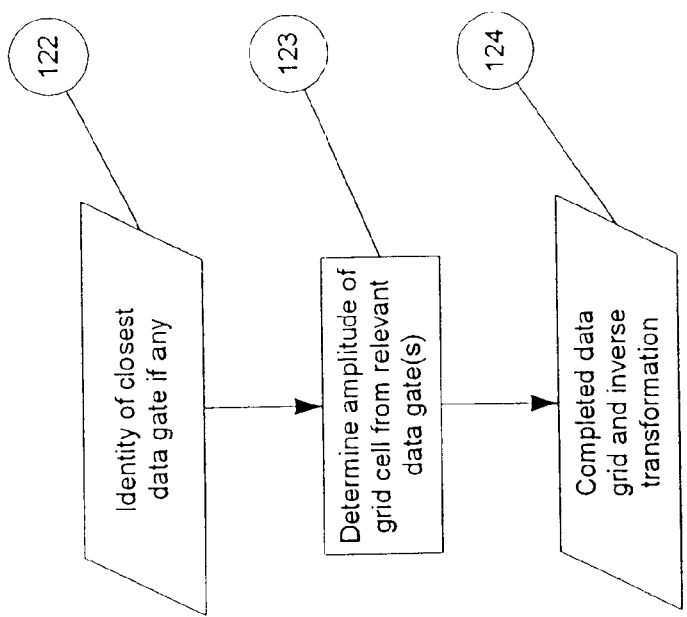
Figure 13: Assign grid amplitude

PROJECTION OF MULTI-SENSOR RAY BASED DATA HISTORIES ONTO PLANAR GRIDS

RELATED PATENTS AND APPLICATIONS

This application claims the benefit of U.S. Provisional Application 60/175,776 filed on Jan. 12, 2000.

FIELD OF INVENTION

The present invention relates to a system and method for transforming multi-sensor data from its measurement coordinates into display grids designed for human display and, more particularly, to a system and method for interpreting and analyzing multi-sensor data.

BACKGROUND OF THE INVENTION

Conventional sensors that create 4-dimensional data include radar, sonar, LIDAR, and many types of medical sensors. These sensors collect data as a series of 1-dimensional rays through the environment as a function of time. Typically, in these conventional systems, a series of such arrays of measurements are made at closely-spaced points in time where each array of measurement is made in a coordinate system determined by the position and orientation of the sensor at the time the measurement is made. Such data can be difficult to interpret in its raw form because the data is often collected in a polar or spherical coordinate system, and because, the sensor's position and/or orientation cannot be precisely controlled at the instant of measurement. The problem of data analysis and interpretation is further compounded by the fact that the sensor's position changes with time. Furthermore, multiple sensors in different locations may provide data each having different characteristics.

Because modern sensors have the ability to collect large numbers of observations per second, there currently exists a need for a system and method to filter the large volume of raw data, determine which parts of the data are needed for a particular display, extract only these relevant portions for processing, and, finally, to display data for interpretation in the observer's chosen coordinate system.

SUMMARY OF THE INVENTION

It is accordingly an object of the present invention to provide a system and method that can enable an operator to specify what data is of interest and use that specification to process only the data required to synthesize the requested display.

It is another object of the invention to allow historic data and data from multiple sensors to be used to satisfy the operator's display requirements thus obviating the need for additional data measurements by the sensors and allowing more of the sensor's duty cycle to be made available for additional uses.

Operationally, the invention described herein and shown in FIGS. 1–13 has many benefits and advantages over conventional systems. In particular, most sensors in conventional systems lack the ability to measure data in a format that directly suits an operator's needs. For example, radar measures data in a polar or spherical coordinate system with the origin at the radar's current spatial location. Each sweep of the radar antenna is considered to be a frame of data. In one embodiment of this invention, the operator requires a Cartesian PPI (Plan Position Indicator) for use in planning a navigation strategy. Each radar pulse in the sweep produces an array of data corresponding to range gates out to a maximum range along a 1-dimensional line-of-sight. Generally, one frame of data cannot fill a regular Cartesian grid such as horizontal slice at a constant altitude. Even with an electronically scanned antenna, it is difficult and inefficient use of the sensor's time line to measure explicitly vertical or horizontal slices. Using this method and apparatus, multiple polar sweeps would be taken and then transformed into as many independent planar slices as desired.

Continuing with the example of airborne weather radar as the embodiment of this invention, where the returns from individual pulses from the radar are measurements of power as a function of range, where range is quantified into discrete cells. Each individual return corresponds to a line of sight, or ray, along which the antenna's main lobe is assumed to point and along which the measured targets are assumed to lie. Typically, each such ray has a direction specified by the azimuth and elevation of the ray in the coordinate system determined by the position and attitude of the aircraft at the time the measurement was made.

For many sensor systems (i.e., radar), the rays can be considered to follow essentially straight-line paths. However, many propagation media exhibit refraction or diffraction effects that can cause the rays to deviate from straight lines. As long as there is a deterministic way to characterize this bending, the current invention permits even curved ray paths to be used.

A collection of such rays can be grouped into a frame. In the example of a weather radar with a mechanically scanned antenna, the collection of rays taken during a single scan of the radar with a constant measurement basis makes a logical grouping for a frame. In other instances, other groupings may be more appropriate. In grouping a collection of rays into a frame, it is useful to maintain them in a common local coordinate system. In the case of the aforementioned radar, a logical choice is the coordinate system of the first pulse in the scan. Because this is known at the beginning of the scan, the subsequent pulses can be converted to this coordinate system in real time, as they arrive. This coordinate transformation is determined by the position and orientation of the radar at the time of the measurement and is different for each pulse. In the case of fixed (e.g. ground-based) radar, no coordinate transformation may be necessary.

Once the data is collected into frames, the frames may be saved in a frame database from which they may be accessed for subsequent processing and display. Note that while the individual measurements within a frame have been translated to a common coordinate system within the frame, each frame is stored in the database in a coordinate system that is specific to that individual frame.

The user may access the data in the frame database for subsequent processing or to generate displays. In the example of weather radar, one way in which the data may be accessed is in generating a horizontal or vertical planar slice through the 3-dimensional volume of space being measured. Another way in which the data may be accessed is in generating a voxel image of a 3-dimensional volume of space. Such methods may request data along a regular grid of points in a coordinate system that is independent of the coordinate systems in which the individual frames are stored. Note that the regular grid of points may be in any arbitrary orientation and need not be aligned with any horizontal or vertical.

Ray coordinates from each collection system frame are first transformed from their local measurement coordinate system into the planar grid coordinate system. In this common coordinate system, the ray coordinates are then transformed into a grid analysis space such that the image grid plane is in the x-y plane, and distance out of plane is the z dimension. This is implemented using a single coordinate transformation.

In a typical application, data collected over time by one or more sensors is measured in many different spatial coordinate systems. This can be due to the inherent motion of the sensor itself, or an inability to control the sensor's position to within the measurements spatial precision. Also, when studying the evolution of spatial data in a sequence of displays or data extraction operations, the desired output coordinate system changes continuously. To be useful, data from all relevant measurement frames considered by a human operator or computer algorithm in a single analysis must ultimately be transformed into a single spatial coordinate system. This method implements a sequence of transformations which utilize each individual data frame's measurement coordinate systems and the desired output spatial system to efficiently implement the coordinate conversions.

After applying the coordinate transformations and quantization of the data to the analysis grid, the method can utilize the time (history) dimension to analyze short-term time dependent phenomena and suppress measurement noise. The method also produces indications of which grid cells have not been measured by any sensor system during the time interval and contain no sensor information. This information may be used in the scheduling of subsequent measurements. The efficiencies of: 1) storing the data in the individual frame coordinate systems, and 2) retrieving only the data needed to fill the requested coordinate grid, permit such processing to take place in real time in situations where less efficient processing may have precluded real time functioning.

The disclosed invention further relates to the transformation of data sampled at discrete points through a 3-dimensional sample volume as it evolves over time. The sensor's position and orientation sample the space through a coordinate system translated and rotated from the orientation of the intended display coordinate system. This is typically the case for radar systems onboard aircraft, surface ships, and spacecraft where the orientation of the craft is dynamically changing as a function of time. This is also applicable to other sensor systems including LIDAR, sonar and infrared systems on a variety of moving platforms. For a Radar, LIDAR or sonar sensor, range samples of the data are collected as the sensor scans in azimuth and/or elevation. Due to the translation over time and the interaction of the platform with the physical world, each scan is typically not coincident with any other scan nor is it consistent with the desired display coordinates.

Present day airborne weather radar systems present weather information to the pilot as a Planned Position Indicator (PPI) display. A PPI display is a polar presentation form that indicates signal return strength as a function of range and angle from the sensor platform. The weather radar is typically used to scan at elevation tilt angles, selected by the radar operator, to best observe the current weather conditions. Since the current weather radar's have elevation beam widths ranging from 3° to 8°, each scan of the radar provides a narrow scan through the 3-D volume of weather.

In the first implementation, multiple scans of the radar, each scan being at a different antenna tilt angle and each scan's origin being translated from the previous based on the aircraft's velocity and time between transmitted samples taken during the scan, are collected into a database of radar reflection data. To display multiple radar scans on the same display, the data must be translated and rotated into a common coordinate system consistent with the display coordinates. A number of U.S. patents have approached this problem by translating, rotating and spatially quantizing data into voxels in 3-space. Since weather radar' data typically covers ranges out to 320 nmi, and cover a scan angle of 180°, a database made up of voxels on the order of the size of typical weather features would be enormous. Also, since the voxels contain information from multiple scans, there is no direct way to remove aging weather information from the database. Generating generalized slices through the 3-D space defined in voxels requires another rotation adding even more quantization to the final display image. Also, no mechanism is provided to discriminate voxels that have been examined yet contain no reflected energy versus those that have not been examined. The disclosed invention solves other practical implementation issues of the prior art by defining a 3-D weather database and generalized slicing display mechanism.

As is described in greater detail below, this means and apparatus are expected to serve in a number of applications. Real time generation of multi-planar images of multi-source weather data for airplane navigation is one good application. This detail description will focus on how the invention serves to meet that need. Other applications follow by implication.

In accordance with one embodiment of the invention, an apparatus for transforming data into planar grid for display for use in an airborne weather radar system is disclosed, where the apparatus comprises: a plurality of sensors for collecting data; a frame generator which receives data collected by the sensors and transforms the data into individual data frames for further processing; a database which receives the data frames from the frame generator; an input device for receiving requests from a user for a planar grid of interest; a CPU which, in response to instructions received from the input device, (i) requests data frames of interest from the database for display, (ii) transforms the data frames of interest to a common coordinate system, (iii) filters the data frames of interest for relevance to the planar grid of interest, and (iv) marks data frames identified as relevant; and a display for presenting the planar grid of interest based on the data frames marked as relevant.

In accordance with another embodiment of the invention, a method for transforming data into a planar grid for display for use in an airborne weather radar system is disclosed, where the method comprises the steps of: collecting data from a plurality of sensors; transforming the data into individual data frames for further processing; storing the data frames in a database; receiving a request from a user for a planar grid of interest; requesting data frames of interest from the database for display; transforming the data frames of interest to a common coordinate system; filtering the data frames of interest for relevance to the planar grid of interest; marking the data frames identified as relevant; and displaying the data frames marked as relevant on a planar grid.

BRIEF DESCRIPTION OF THE DRAWINGS

The following drawings are included to provide an understanding of the invention and constitute a part of the specification.

FIG. 1 illustrates a method and apparatus developed in accordance with the present invention in context with other equipment in a typical application.

FIG. 2 illustrates a typical situation in which the method and apparatus developed in accordance with the present invention would be used by aircraft aided by ground based radar data to avoid severe weather.

FIG. 3 depicts the measurement conditions experienced by aircraft during flight in severe weather.

FIG. 4 illustrates a frame of data measured by a commercial aircraft attempting to make a fixed elevation angle azimuth scan.

FIG. 5 indicates the definition of an image grid plane for projection purposes.

FIG. 6 shows the coordinate transformations necessary to project multiple data frames onto an independent common image grid.

FIG. 7 shows the physical process involved with projecting ray data gates onto a planar array of display grid cells FIGS. 8a and 8b depict the arrangement of multiple planar grid cell arrays into 3-D volumetric displays.

FIG. 9 outlines the overall architecture of the method and system developed in accordance with the present invention.

FIG. 10 describes how the data frames and grid definitions are converted into the coordinate transformations from image space into the grid plane.

FIG. 11 shows how the data rays from individual measurement frames are transformed into display space and culled on relevance criteria in accordance with the present invention.

FIG. 12 describes how individual data gates from relevant rays are further culled on relevance criteria in accordance with the present invention.

FIG 13 shows how grid amplitudes are assigned on the basis of data gate relevance.

DESCRIPTION OF THE INVENTION

FIG. 1 illustrates one embodiment of a method and system developed in accordance with the present invention. The system shown in FIG. 1 includes an on-board sensor 1, a on-board frame generator 2 which receives data collected from the sensor 1, a communication link 4 which receives data from external sensors, and a communication frame generator 5 receives which received data from the communication link 4. The frame generators 2 and 5 forward the frame data to a real time frame database 3.

The real time frame database 3 then forwards the sensor data frames 6 to a CPU 8 which performs a planar grid slicing method on the data. The purpose of planar grid slicing method performed by the CPU 8 is to generate data slice(s) 11 in response to display requirements 10 entered into the system by an operator through an input device 12. These slices 11 are generated so as to facilitate the generation of 2-D and 3-D images on operator displays 14 by a display-rendering engine 9. The display 14 and rendering engine 9 implement contemporary computer graphics art.

In this example, the real time frame database 3 receives data frames from both the on-board frame generator 1 and the communications-linked frame generator 5. Each data frame contains the sensor's identity, its spatial location and orientation, the spatial and temporal parameters of each data measurement ray, and the measured data itself. A representative frame for the example of an airborne weather radar system is shown in FIG. 4.

The CPU 8 receives these data frames 6 from the real time frame database 3 in response to data frame requests 7. The real time frame database 3 maintains a limited history of data frames. These frames contain a compressed form of the measured data, the global time that each ray was measured, the spatial definition of each data ray, and the local coordinate system in which the data was measured. Frame records are maintained for a period of time that may be determined by the operator or by the system, dependent upon operator controls, and/or based on the temporal characteristics of the phenomenon being measured. The real time frame database 3 receives data requests 7 generated by the CPU 8 and responds with data frames 6.

FIG. 2 illustrates the application of the planar grid slicing apparatus in an airborne weather avoidance scenario. In this scenario, two commercial aircraft 17 and 20 are approaching a serious storm cell 18 that is being monitored by a ground based NEXRAD radar 22. Each aircraft is operating its on-board weather radar, and is generating local data frames 15, 16, 19, and 21 as it continues along its flight path.

Typically airborne weather radar collects complete local data frames on a 4-second interval, and NEXRAD data is updated every 5 to 6 minutes. Some of these local frames contain weather information 15 and 19 that could be communicated to other aircraft in the vicinity, along with the corresponding navigation information. Data from the NEXRAD site 22 may also be communicated to other aircraft in the vicinity. Onboard navigation instruments continually maintain each aircraft's geographic position and orientation. The NEXRAD radar includes instruments to record its beam orientation, and is stationary at a surveyed position. Flight crew members aboard both aircraft are observing composite displays of data generated by the planar slicing method 8, and conducting maneuvers 23, 24, and 25 to avoid the storm as its position is known to them.

As depicted in FIG. 3, each aircraft has a flight path 29 that, in general, varies in altitude. These altitude variations can easily be a significant fraction of the onboard radar's elevation beam width 26. In addition, the radar will likely be operated at different elevation tilt angles 27 and 28, as it conducts its forward-looking azimuth sweeps. Many of the azimuth/elevation sweeps will measure the same airspace volume 30.

FIG. 4 is an orthographic projection of the measurement grid of a single frame of real flight radar data. Spatial units are in meters, and data amplitudes are not shown. This data was taken by commercial airborne radar aboard an aircraft flying in benign weather, and was intended to be an azimuth sweep at a constant elevation angle. Data spatial measurement coordinates 42 are shown in a local Cartesian system with axes oriented East, North, and Up 39, 34, and 31 from a single origin at known Latitude and Longitude. To aid in visualization, the 3-D frame of data is projected into the East-North plane 37. A single radar pulse or beam propagates along the ray (e.g., 41 to 33) at a single azimuth and elevation angle. A single range gate (constant range) is shown along lines 32 to 40. Variations in the 3-D slope of adjacent beams are caused by the radar position control system not being able to completely compensate for aircraft motion during the frame measurement intervals. These variations can be a significant fraction of the radar's measurement beam width and must be explicitly compensated in the construction of planar image grids.

As depicted in FIG. 5, 2-dimensional image grids may be defined in any local coordinate system with an arbitrary orientation and position relative to a local Cartesian system. In particular, it is not required that the image grid be flat, only that it be transformable into a 2-dimensional plane. The local coordinate system is defined by its origin 44 and unit vectors 45, 46, and 47 that relate the local coordinate system 44 to a fixed global reference 49 via an offset vector 48. In this example, an image plane 50 is defined in the local system 44 by its normal vector 51 and an offset vector 52 with endpoint in the image plane. A regular grid 53 is imposed in this image plane. Regularity allows the index of the grid to be computed from its coordinates, and is required for computational efficiency. For example, if the location of the i, j'th cell in a 2-D regular grid is defined by, $$\begin{bmatrix} x(i) \\ y(i) \end{bmatrix} = \begin{bmatrix} x_{min} + (i-1)*dx \\ y_{min} + (j-1)*dy \end{bmatrix}$$

then, the identity of the closest grid cell can easily be determined from, $$\begin{bmatrix} i \\ j \end{bmatrix} = round \begin{bmatrix} 1 + \dfrac{x - x_{min}}{dx} \\ 1 + \dfrac{y - y_{min}}{dx} \end{bmatrix}$$

FIG. 6 illustrates how two coordinate transformations 56 and 61 are required to project data from two data frames into a single planar image grid. Each of the 3 coordinate systems involved, Frame 1 54, Frame 2 68, and Image Grid 55, are referenced to a fourth common reference coordinate system 69 through offset vectors 57, 63, 58 and local system 54, 55, and 68 unit vectors expressed in the common reference coordinate system axes 59, 64, and 65. The local system unit vectors can be used to form an orthogonal rotation matrix. In the example application, where the positions of the ground based radar and the local measurement coordinate systems are known in terms of latitude, longitude, and altitude above sea level and where the common reference coordinate system is at earth center; the standard WGS-84 specification defines the necessary offset vectors and rotation matrices.

Transformation of a data frame from one system to another is accomplished by rotating and translating the individual data rays 67. The projection of these data rays into the x-y plane are shown to aid in visualization 62. Individual data range gate locations may readily be computed from the transformed data ray geometry. One embodiment of the coordinate system transformations described herein uses homogeneous coordinate systems and transformations. A series of three dimensional rotations and translations is transformed into a single four-dimensional transformation (expressible as a 4 by 4 matrix multiply). Multiplication of two homogeneous transformations is another homogeneous transformation. Thus, an arbitrarily complex sequence of rotations and translations may be reduced to a single 4×4 matrix multiply, which can be inverted to reverse the transformation.

FIG. 7 depicts the planar grid (see FIG. 5) defined by its unit normal vector 51 and an offset vector 52 in a final coordinate system (see FIG. 6) 55. To facilitate processing, the planar grid is rotated and translated into a grid formation system 80 such that the image unit normal vector 51 is coincident with the z-axis 79 and the planar array is in the x-y plane 81. This transformation matrix is saved, and its inverse used to map the planar grid back into the display coordinate system for 3-D image presentation.

Once the data rays and associated data range gates have been mapped into the grid formation system, the problem depicted by FIG. 7 is addressed. Data measured in range gates 74 along each data ray 70 are transformed into a regular grid of cells 73. Each data range gate 74 has a vertical projection 71 into the image plane along the data ray projection line 72 and 78 in the image plane. In general, this projection will not lie on a grid cell.

Physical sensors all have a characteristic impulse response 76, which defines the signal attenuation that will be experienced when a phenomenon is measured offset from the ray direction 70. For radar with conventional signal processing, an impulse response is typically defined by its half power beam width and range gate length. This impulse response is related to the spatial resolution of the sensor. For radar, two scatterers in a common impulse response volume will result in a single measurement and the scatterers precise position can not be resolved with that one piece of data. Adopting the posture that the measurement resulted from a single scatterer at the data gate's position, one can compute the range gate's footprint 75, and use the sensor's impulse response to determine which planar grid cells would sense that scatterer 82 and 83 at what level. Grid cells outside the footprint 73 and 77 receive no information.

As shown in FIGS. 8a–8b, multiple planar grids can be defined in a single image coordinate system. Specifically, in FIG. 8a, several horizontal grids 85 and 86 are shown in a single image 84. Standard 3-D hidden surface removal means are used to form the final image. In FIG. 8b, a vertical 88 and horizontal 89 grid are used to form an axonometric display in a single display coordinate system 87.

FIG. 9 illustrates the architecture of the planar grid projection method. Data frames and grid definition parameters 90 are used to compute the homogeneous transform matrices necessary to transform from each component data frame to the image analysis space 55, and from the image space into the planar projection space 60 and 80. Given these matrices, all data rays are transformed into the planar projection space and filtered for relevance to minimize computation 91. Data rays that may not contribute to the display grid are dropped from further analysis. Data gates from relevant rays that could contribute to the image are further tested against the sensor impulse response function 92. Data gates that are found to be within the impulse response volume of a grid cell are identified and assigned to their respective cells 93. This can be many to one, or one to many. Grid cells with no associated data gates are marked as "No Information". Finally, each grid cell's amplitude is determined from the collection of associated data gates 94. A simple rule for this determination is to assign the grid cell the attenuated amplitude of the data gate with the minimum angle off ray bore sight. The final grid is returned in the grid analysis space 80 with the transformation used to place the grid onto the x-y plane. The inverse of this transform maps the image back into the image analysis system, which is typically set to the current aircraft location.

FIG. 10 indicates how the transformations are computed. Starting with the identity of the frames required for the current image and the image grid definition 95, the necessary data frames are retrieved from the data base 96 and the grid projection plane transformations developed 98. For a simple planar grid, the projection is; (1) translate the plane to the origin along the normal vector, (2) rotate about the z-axis to place the normal vector in the y-z plane, and (3) rotate about the x-axis to place the normal vector on the z-axis.

Transformation matrices 97 and 99 from each data frame into the image analysis system are developed using the coordinate transformation method described above. The two matrices generated in 97 and 99 combine to form a single transform for each data frame from the grid space into the image analysis space 100. These matrices are the result of this stage 101.

FIG. 11 illustrates how the data rays from the individual measurements frames are transformed into display space and culled on relevance criteria in accordance with the present invention. Starting with the data frames and grid definition 102, and the transformation matrices 103, all frames are processed in a master loop 104. End points of all rays of the frame are transformed into the grid analysis space 105. For each ray of the frame 106 two auxiliary rays, one beam width above and below the data ray, are constructed. If either of these rays crosses the x-y plane, then the ray is relevant 107. Each range gate of all relevant rays 108 is tested to determine if they are within a beam width of the x-y plane 109. If so, they may be relevant. Range gates that are within a beam width are then tested to determine if their vertical projection is within the analysis grid 110. If so, they may be relevant, and are added to the detail process list 111. The result is a list of potentially relevant data range gates with coordinates in the grid projection system 112.

FIG. 12 illustrates how individual data gates from relevant rays are further culled on relevance criteria in accordance with the present invention. Specifically, FIG. 12 indicates the last test against potentially relevant data gates. It begins with the full list of potentially relevant data gates from all data frames in the grid analysis coordinate system 113. For each data gate in the processing list 114, grid cells within a local search box with 2 beam widths on a side are identified 115. These grid cells form a local search area. Each grid cell in this search list 116 is tested to determine if it is within 1 range gate length 117 and 1 beam width of the data gate 118. Grid cells that pass both tests are marked with the most relevant data gate observed during this process 119 and 120. In this realization, the result is the identity of the data gates, if any, most relevant to each grid cell 121.

FIG. 13 illustrates how grid amplitudes are assigned on the basis of data gate relevance. Starting with the identity of the most relevant data gate (if any) for each grid cell 122, data amplitudes are determined by the sensor's impulse response function 123. The result is the array of planar grid cells filled with the most relevant amplitude estimates, or marked as "No Information" 124.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims. Alternate embodiments may be devised without departing from the spirit or the scope of the invention.

What is claimed is:

1. An apparatus for use in a radar system for transforming data into planar grid for display, said apparatus comprising:
   a plurality of sensors for collecting data;
   a frame generator which receives data collected by the sensors and transforms the data into individual data frames for further processing;
   a database which receives the data frames from said frame generator;
   an input device for receiving requests from a user for a planar grid of interest;
   a CPU which, in response to instructions received from the input device, (i) requests data frames of interest from said database for display, (ii) transforms the data frames of interest to a common coordinate system, (iii) filters the data frames of interest for relevance to the planar grid of interest, and (iv) marks data frames identified as relevant; and
   a display for presenting the planar grid of interest based on the data frames marked as relevant.

2. An apparatus for transforming data into display grids as described in claim 1, wherein:
   the planar grid of interest is rotated and translated into a grid formation system;
   the data frames of interest are mapped to the grid formation system;
   all rays of each data frame are constructed and projected to the grid formation system; and
   a ray is marked as relevant if the ray crosses the x-y plane of the grid formation system.

3. An apparatus for transforming data into display grids as described in claim 2, wherein:
   each data gate of a ray marked as relevant is further marked as relevant if said data gate is within one beamwidth of the x-y plane of the grid formation system.

4. An apparatus for transforming data into display grids as described in claim 3, wherein:
   each grid cell of the grid formation system within one beamwidth box of each data gate marked as relevant is identified;
   each identified grid cell is compared with each data gate marked as relevant to determine if the grid cell is within one range gate and one beamwidth of the data gate; and,
   the most relevant data gate is identified.

5. An apparatus for transforming data into display grids as described in claim 4, wherein the amplitude of the most relevant data gate is determined and the data is transformed onto the planar grid for display.

6. A method for use in a radar system for transforming data into planar grid for display, said method comprising the steps of:
   (1) collecting data from a plurality of sensors;
   (2) transforming the data into individual data frames for further processing;
   (3) storing the data frames in a database;
   (4) receiving a request from a user for a planar grid of interest;
   (5) requesting data frames of interest from said database for display;
   (6) transforming the data frames of interest to a common coordinate system;
   (7) filtering the data frames of interest for relevance to the planar grid of interest;
   (8) marking the data frames identified as relevant; and
   (9) displaying the data frames marked as relevant on a planar grid.

7. The method for transforming data into display grids as described in claim 6, further comprising the steps of:
   rotating an translating the planar grid of interest into a grid formation system;
   mapping the data frames of interest to the grid formation system;
   constructing and projecting all rays of each data frame to the grid formation system; and
   marking a ray as relevant if the ray crosses the x-y plane of the grid formation system.

8. The method for transforming data into display grids as described in claim 7, further comprising the steps of:
   marking each data gate of a ray marked as relevant as further relevant if said data gate is within one beamwidth of the x-y plane of the grid formation system.

9. The method of transforming data into display grids as described in claim 8, further comprising the steps of:

identifying each grid cell of the grid formation system within one beamwidth box of each data gate marked as relevant;

comparing each identified grid cell with each data gate marked as relevant to determine if the grid cell is within one range gate and one beamwidth of the data gate; and, identifying the most relevant data gate.

10. The method of transforming data into display grids as described in claim 9, further comprising the steps of:

determining the amplitude of the most relevant data gate;

transforming the data onto the planar grid for display; and identifying display grids which do not contain information.

* * * * *